United States Patent [19]

Guironnet

[11] Patent Number: 5,011,206
[45] Date of Patent: Apr. 30, 1991

[54] DEVICE FOR EXTRACTING FOREIGN PIECES OR PARTICLES FROM FUEL ASSEMBLIES OF A NUCLEAR REACTOR

[75] Inventor: Louis Guironnet, Lyons, France

[73] Assignees: Framatome, Courbevoie; Cogema, Velizy Villacoublay, both of France

[21] Appl. No.: 373,554

[22] Filed: Jun. 30, 1989

[30] Foreign Application Priority Data

Jul. 4, 1988 [FR] France ................. 88 9025

[51] Int. Cl.⁵ .................................. G21C 19/26
[52] U.S. Cl. ............................. 294/86.41; 294/66.1; 294/906; 376/260; 414/732
[58] Field of Search ............... 294/86.41, 906, 19.1, 294/66.2, 86.13, 86.16, 66.1; 376/260, 261; 414/732–734, 738–741

[56] References Cited

U.S. PATENT DOCUMENTS

| | | | |
|---|---|---|---|
| 3,346,293 | 10/1967 | Wilcox | 294/19.1 |
| 3,843,184 | 10/1974 | Horton, III | 294/66.2 |
| 4,615,555 | 10/1986 | Bateham | 294/19.1 |
| 4,652,418 | 3/1987 | Baric et al. | 376/260 X |
| 4,753,473 | 6/1988 | Arnett | 294/19.1 X |

FOREIGN PATENT DOCUMENTS

| | | |
|---|---|---|
| 0252375 | 1/1988 | European Pat. Off. |
| 0192406 | 2/1988 | European Pat. Off. |
| 1211440 | 3/1960 | France |
| 2525799 | 10/1983 | France |

Primary Examiner—Margaret A. Focarino
Assistant Examiner—Dean J. Kramer
Attorney, Agent, or Firm—Pollock, Vande Sande & Priddy

[57] ABSTRACT

The device comprises a vertical pole (11) having a manipulating handle (14) at its upper end and a gripper (22) fastened to one end of a gripper support (20) mounted pivotally about a horizontal axis (21) at the end of the pole (11). Springs (25, 29) make it possible to return the gripper into a grasping position distant from the vertical axis ZZ' of the pole (11). A mechanism (24) for controlling the gripper in order to open and close it is carried by the gripper holder (20). This mechanism is connected to a remote-actuation mechanism by a flexible transmission element (37).

6 Claims, 4 Drawing Sheets

DEVICE FOR EXTRACTING FOREIGN PIECES OR PARTICLES FROM FUEL ASSEMBLIES OF A NUCLEAR REACTOR

FIELD OF THE INVENTION

The invention relates to a device for extracting foreign pieces or particles from fuel assemblies of the core of a nuclear reactor which are placed under water in a pool.

BACKGROUND OF THE INVENTION

The fuel assemblies of nuclear reactors cooled by light water, especially the fuel assemblies of pressurized-water nuclear reactors, consist of bundles of rods of great length which are held by means of spacer plates transverse relative to the bundles and by means of two end sockets.

The framework of the assemblies comprises not only the spacer plates and the sockets, but also guide tubes substituted for some rods of the bundle and fastened rigidly to the spacers and the sockets.

The cooling fluid of the reactor consisting of water circulates in the longitudinal direction of the assemblies between the rods and in contact with their outer surface.

During the functioning of the reactor, some mechanical pieces of its internal structures are liable to be damaged and come loose under the effect of corrosion and wear.

In addition, during maintenance operations on the nuclear reactor during a shutdown, some particles or pieces of small size detached by machining during a repair or conversion carried out on the reactor are liable to remain in the vessel at the time of the recommissioning of the reactor, if cleaning has not been carried out perfectly. Likewise, during the periods of maintenance of the reactor, tools or tool accessories of small size can fall into some inaccessible parts of the reactor structures or be forgotten by the maintenance personnel.

At all events, the pieces, particles or tools remaining in the vessel at the time when it is recommissioned are carried along at high speed by the circulating cooling water and come to rest in those parts of the reactor which are of complex structure and which are capable of retaining them.

In particular, the pieces or particles of small size are liable to come to rest and be jammed in the space between the rods of the assemblies. This results in risks of local heating of the fuel rods attributable to the disturbances in the circulation of the cooling fluid. Increased and accelerated corrosion of the sheath of the rod is then seen locally, and this can lead to damage and to loss of sealing of this sheath.

Such a loss of sealing results in a propagation of the fission gases throughout the entire primary circuit, and therefore in high risks of contamination.

The foreign pieces or particles circulating together with the primary fluid and forming migrating bodies can also accumulate in the lower socket or upper socket or in the spacer grids for retention of the rods. This results in thermo-hydraulic disturbances in the circulation of the cooling water which can cause a considerable reduction in the coolant flow in contact with the fuel rods.

To date, there has been no known device making it possible to extract foreign pieces or particles lodged in the assemblies of a nuclear reactor and giving rise to disturbances in its functioning.

SUMMARY OF THE INVENTION

The object of the invention is therefore to provide a device for extracting foreign pieces or particles from fuel assemblies of the core of a nuclear reactor which are placed under water in a pool, making it possible to carry out the extraction without the risk of catching inside the complex structure of the assemblies.

To this end, the extraction device according to the invention comprises:

a vertical pole having a manipulating member at its upper end, a gripper fastened to one end of a gripper support mounted pivotally about a horizontal axis at the lower end of the pole, elastic means for the return of the pivoting gripper support, so as to return the gripper into a grasping position distant from the vertical axis of the pole, and a mechanism for controlling the gripper in order to open and close it, carried by the gripper holder and connected to remote-actuation means by a flexible transmission element.

BRIEF DESCRIPTION OF THE DRAWINGS

To make it easy to understand the invention, an embodiment of an extraction device according to the invention for the fuel assemblies of a pressurized-water nuclear reactor will now be described by way of example, with reference to the accompanying drawings.

DESCRIPTION OF PREFERRED EMBODIMENT

Figure 1:
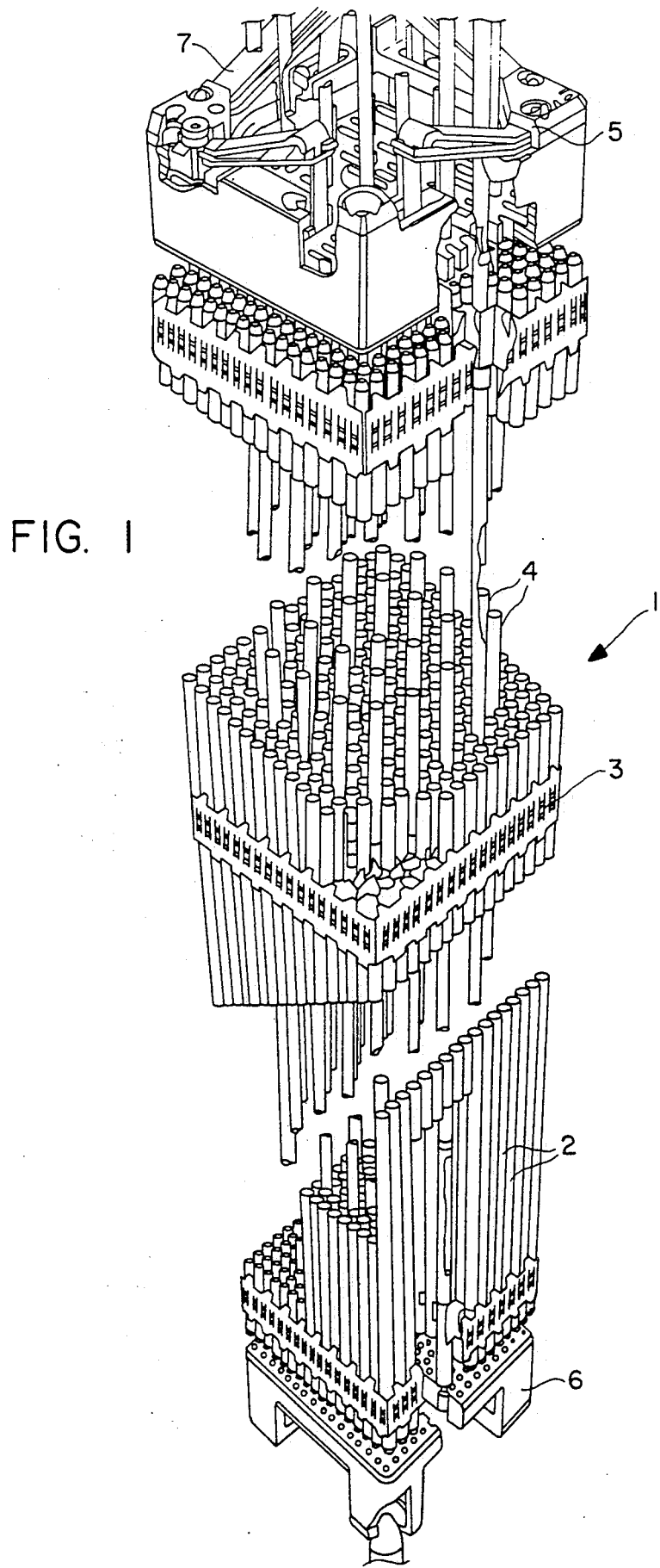
FIG. 1 is an exploded perspective view of a fuel assembly of a pressurized-water nuclear reactor.

As shown if FIG. 1, fuel assembly 1 consists of a bundle of parallel fuel rods 2 of great length which are held transversely according to a regular network by means of spacer grids 3.

Some positions in the network are occupied by guide tubes 4 substituted for some rods 2. The guide tubes 4, the length of which is greater than that of the fuel rods 2, are connected at their ends to the upper socket 5 and to the lower socket 6 of the assembly. The guide tubes 4 are also fastened to the grids 3, the assembly consisting of the sockets 5 and 6, of the guide tubes 4 and of the spacer grids 3 forming the assembly framework in which the rods 2 are placed.

The upper socket 5 carries springs 7, on which the upper core plate comes to bear when the assembly 1 is put in the vertical position, as shown in FIG. 1, in the core of the reactor.

The spacer grids 3 generally consist of zirconium-alloy sheets intersected and joined together. These spacer grids define cells, each receiving a fuel rod or a guide tube. The fuel rods are held in the cells by means of a set of bosses, consisting of parts of the sheets cut out and embossed, and attached nickel-alloy springs. The sheets are also cut and bent to form vanes intended for mixing the cooling fluid and arranged in the extension of the cells. Finally, the spacer grids are provided, on their outer peripheral part, with guide vanes which project slightly.

The sockets of the assembly, especially the upper socket 5, likewise have projecting parts, such as the retaining springs 7.

The fuel assembly therefore has many roughnesses which are liable to retain migrating bodies transported by the cooling water of the reactor, at any level of the assembly.

The tool according to the invention, which will be described below and which is illustrated in FIGS. 2 to 6, makes it possible to extract pieces or particles lodged in a fuel assembly at any level over the height of this assembly.

The device according to the invention makes it possible to work when the assemblies are placed under water, either in the pool of the reactor or in the cooling pond.

This device is used when the presence of a migrating body in part of an assembly has been detected, for example by means of a video camera.

If the migrating body is accessible, for example inside the vessel of the reactor, the work is carried out from the upper level of the reactor during the maintenance operations on this reactor, the assembly remaining in place.

In other cases, the assembly can be placed in a zone of the pool of the reactor or of the cooling pond, to allow access to the migrating body lodged in part of the assembly.

Figure 2:
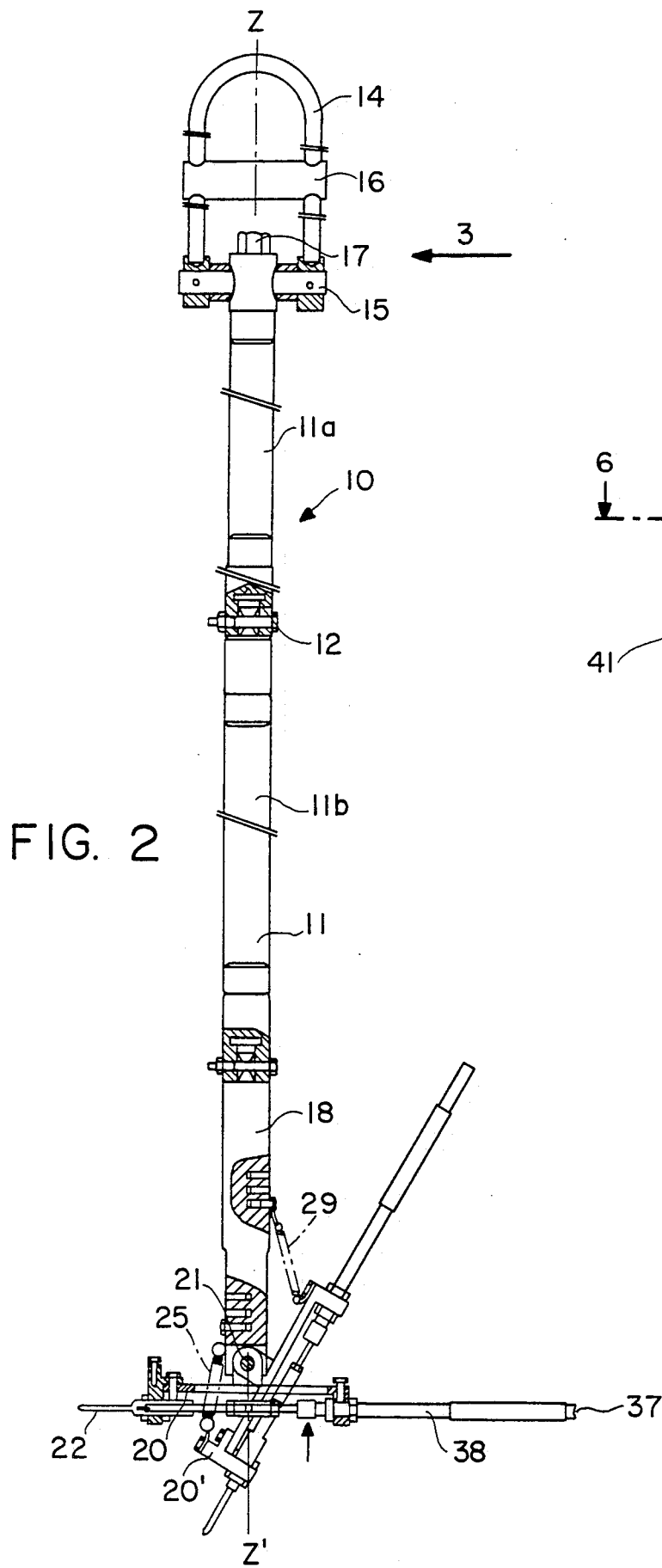
FIG. 2 is a general elevation view of a device according to the invention.

FIG. 2 shows the device, 10, which comprises a pole 11 of great length, for example, from 4 to 8 meters, depending on the depth at which action is taken inside the pool containing the fuel assemblies.

In the operating position of the device, as shown in FIG. 2, the axis ZZ' of the pole is vertical.

The pole 11 consists of successive portions 11a, 11b, etc., connected to one another by means of screw-connection devices 12 and of a number sufficient to reach the desired depth.

The pole is connected, at its upper end, to a manipulating handle or bow 14 by means of a transverse axle 15.

A second axle 16 parallel to the axle 15 is fastened to the manipulating bow above the upper end of the pole 11, on which a nut 17 is fastened rigidly.

Figure 4:
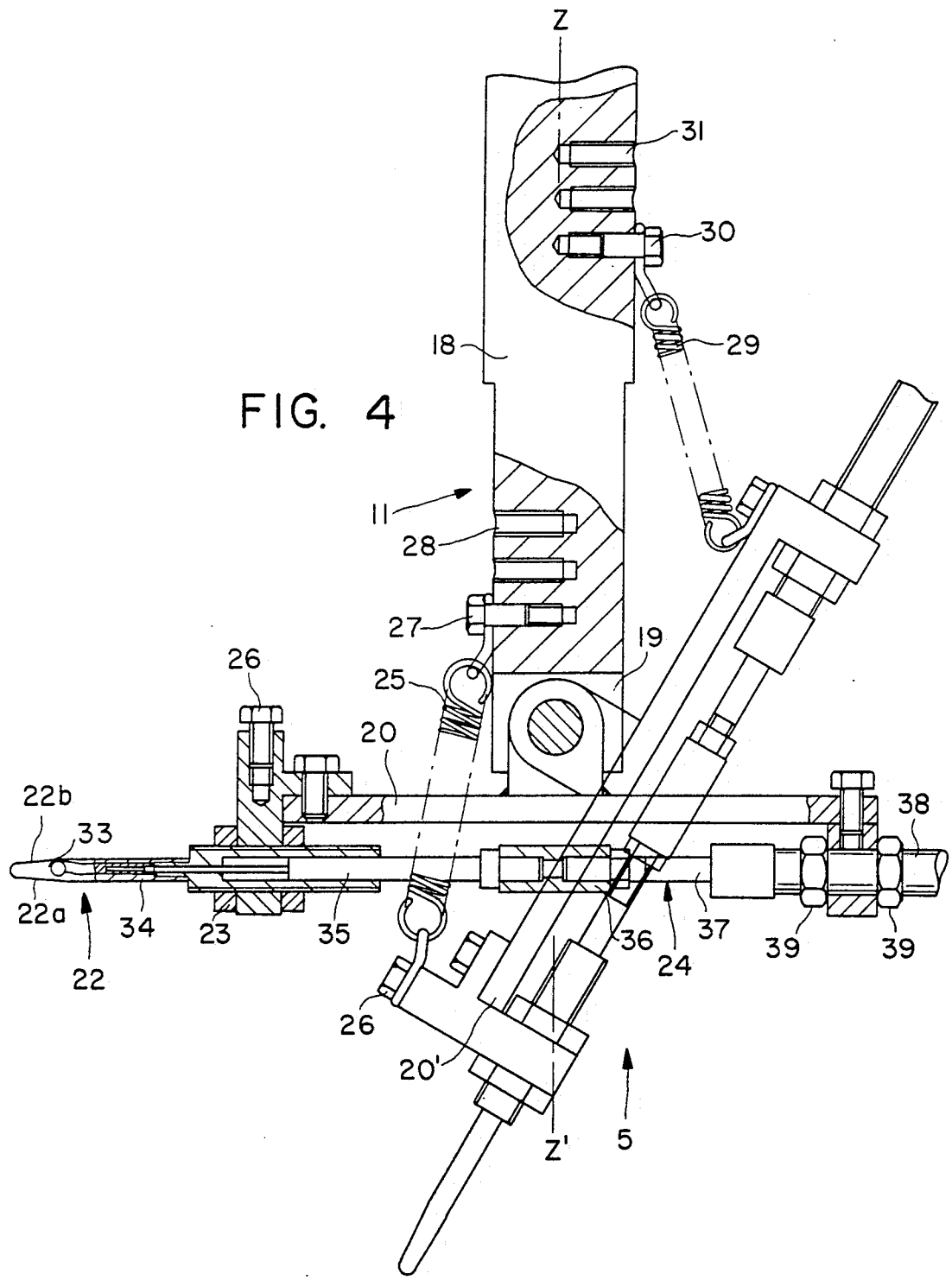
FIG. 4 is a view of the lower part of the device according to the invention on a larger scale and partially in section.

As can be seen in FIGS. 2 and 4, the pole 11 has a lower portion 18 consisting of a solid piece having a lower end machined in the form of a fork 19. A support 20 is mounted in an articulated manner on the end of the pole 11 by means of an axle 21 fastened between the two branches of the fork 19 perpendicularly relative to the axis ZZ' of the pole, i.e., in a horizontal direction.

The support 20, at one of its ends, carries a gripper 22 by means of a gripper holder 23.

Also mounted on the support 20 is the gripper control device 24 which will be described later.

A return spring 25 is inserted between the front part of the support 20 in the vicinity of the gripper holder 23 and the lower part of the pole 11. The spring 25 is fastened to the gripper support by means of a screw 26 and to the pole by means of a screw 27, the position of which can be adjusted as a result of engagement in one of the internally threaded holes 28 provided in the end portion 18 of the pole.

A second spring 29 is inserted between that end of the support 20 opposite the gripper holder 23 and the lower end of the pole. The spring 29 is fastened to the lower end of the pole by means of a screw 30 which can be engaged in one of the internally threaded holes 31 provided in the lower portion 18 of the pole. The arrangement of the screw 30 in an internally threaded hole in a specific position makes it possible to adjust the tension of the spring 29.

The spring 25 has an elastic constant higher than that of the spring 29, and its initial tension is set in such a way that, when no force is exerted on the end of the gripper 22, the support 20 is returned into its horizontal position presented by unbroken lines in FIG. 4. The spring 29 acting in opposition to the spring 25 then experiences a pull exerting a certain upward return on that end of the support 20 opposite the gripper 22.

If the gripper 22 comes in contact with an obstacle, for example during the lifting of the pole, the support 20 is capable of tilting into the position 20' represented by dot-and-dash lines in FIG. 4.

In this position, the spring 25 is under tension, and the spring 29 contributing to the raising of the rear part of the support is to some extent relaxed.

The end of the gripper 22 can thus avoid the obstacle. When the device has escaped from the obstacle, the gripper 22 is returned into its horizontal position by the spring 25 counter to the spring 29.

The gripper 22 has a stationary lower nose 22a fixed to the gripper holder 23 and a movable upper nose 22b mounted on the stationary nose 22a in an articulated manner about an axis 33.

The movable nose 22b is connected, at its end directed inwards, to an actuating cable 34 connected to a first push-pull rod 35, itself connected by means of an adjusting nut 36 to a flexible hose 37 passing through the sheath 38 of a remote-control device fastened to the gripper support 20 by means of nuts 39.

Figure 3:
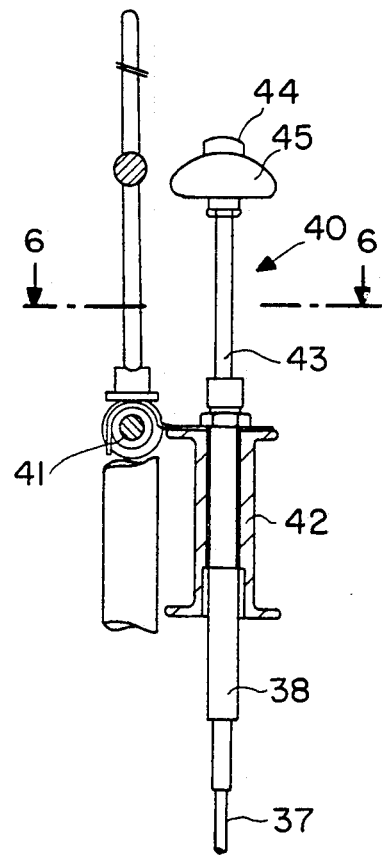
FIG. 3 is a side elevation view according to 3 of FIG. 2.

FIG. 3 shows the actuating assembly 40 of the remote-control device, which can be fastened by means of hooks 41 to the axle 15 fixed to the bow 14.

This actuating assembly comprises a support 42, through which passes an orifice in which the end of the sheath of the remote-control device is fastened. The flexible hose 37 is connected to an actuating rod 43 connected to a pushbutton 44 and to a handle 45 in its upper part.

A push on the button 44 can cause the rapid opening of the gripper by means of the flexible hose 37 of the rod 35 and the cable 34.

A pull on the rod can cause the rapid closing of the gripper by means of the same elements.

Moreover, the handle 45 allows a slow movement of the elements of the remote control by means of a micrometer screw.

It is possible for the control and the gripper to be locked, for example in a closing position, on a piece or particle to be extracted.

Figure 5:
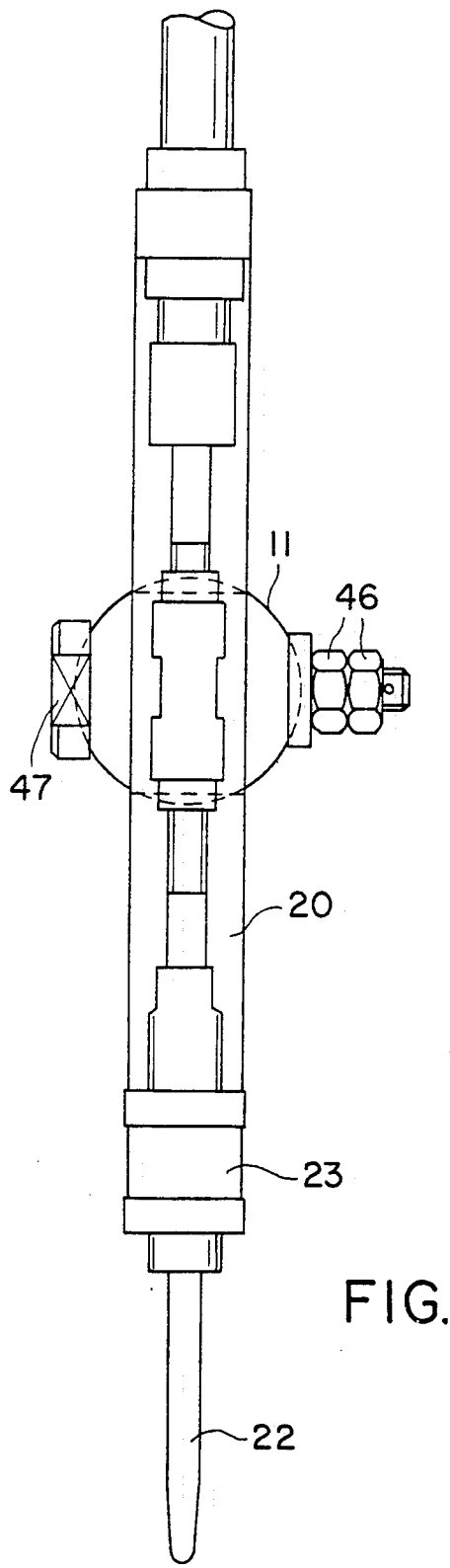
FIG. 5 is a bottom view in direction 5 of FIG. 4.

FIG. 5 shows the mounting of the support 20 of the gripper 22 on the end of the pole 11 by means of a screw 47 and a nut/lock-nut assembly 46.

If a migrating body which cannot be extracted by means of the gripper located in the lower part of the pole has been detected in an assembly, as a result of the removable mounting of the gripper, support and the gripper it is possible for the latter to be replaced by a new gripper of suitable shape and size.

Likewise, by locking the screw 47, any possibility of the pivoting of the gripper support 20 relative to the pole can be eliminated.

Figure 6:
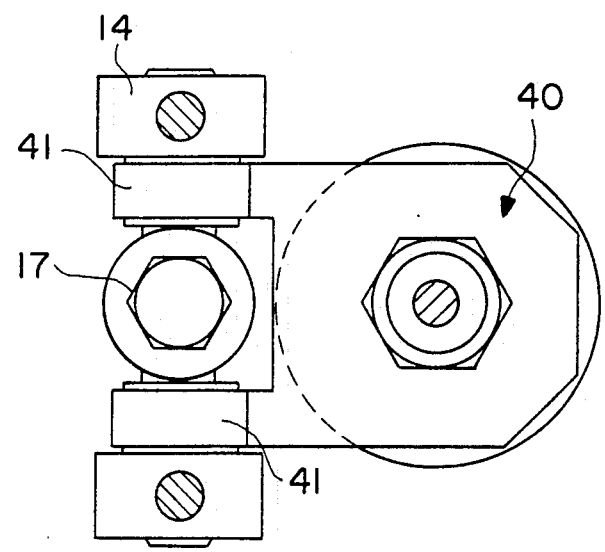
FIG. 6 is a top plan view along line 6—6 of FIG. 3.

FIG. 6 shows the upper part of the device having the remote-control assembly 40 which is fastened to the manipulating bow 14 by means of springs 41. The nut 17 fastened to the upper part of the pole 11 makes it possible to orient this pole, the gripper holder and the gripper in the desired direction when a migrating body has been detected in an assembly. For that purpose, a spanner can be engaged on the nut 17 and the orientation obtained by means of the spanner.

A method of using the device according to the invention for extracting a migrating body blocked in any position in a fuel assembly, such as the assembly shown in FIG. 1, will now be described with reference to the drawings as a whole.

In a first step, the migrating body is detected by means of a video camera lowered under water into the pool in the vicinity of the assembly.

The level at which the migrating body is located is detected, this level being variable between 4 meters below the upper level of the pool (the upper socket of the assembly) and 8 meters (the lower socket of the assembly).

Producing the pole in the form of removable portions makes it possible to adjust the height of this pole as a function of the level at which the body to be extracted is located.

The pole is suspended by means of its bow 14 on a travelling crane which moves along above the level of the pool.

The approach and orientation of the pole making it possible to arrange the gripper in a direction giving access to the body to be extracted are carried out by monitoring the operation by means of a video camera.

Depending on the pole length used for the operation, the flexible hose of the remote-control device is placed virtually straight and parallel to the pole or wound round the pole, its upper actuating end 40 being at a level located above the pool.

An operator uses the actuating assembly 40 manually in order to open the gripper which is brought by means of the travelling crane, both movements monitored by the video camera, into such a position that this gripper can close onto part of the body to be extracted.

The operator then obtains the clamping of the gripper by means of the actuating assembly 40.

The foreign body is extracted as a result of the horizontal movement of the device 10 by means of the travelling crane, and is then removed from the pool by lifting the assembly 10 by means of the winch of the travelling crane.

If, during these operations, the end of the gripper or the migrating body are jammed against an obstacle, the gripper support 20 changes from its horizontal position 20 to its tilted position 20', thus usually making it possible to pass round the obstacle.

Should the operation prove impossible, it could be repeated by using another tool having a gripper of a suitable form.

The pivoting mounting of the gripper prevents any damage to the gripper during operation or to an element of the fuel assembly in which the extraction is carried out.

The device according to the invention therefore makes it possible to obtain an extraction of the migrating body, in most cases without causing damage to the gripper or to part of the fuel assembly when the gripper encounters an obstacle during extraction.

It is clear that, to make it easier for the gripper to pass, according to the obstacles previously detected by video camera, it is possible to adjust the return springs of the gripper support so as to obtain a desired amount of pivoting and a desired tilt of the gripper support and the gripper.

The gripper can have any desired form for carrying out the extraction in a particular zone of a fuel assembly.

Instead of a travelling crane, the pole can be fastened, in its upper part, to carriage having a freedom of movement in three non-coplanar directions (for example, perpendicular to one another in order to form a trirectangular trihedron) and associated with means of exact movement in the three directions.

The support and its return means can have a form different from that described. The amount of pivoting can be set at any value, as can the return force.

The remote-control device of the gripper can be of a type which is different from that described and which employs a push or a pull exerted on a flexible hose. It is possible to have a transmission of a hydraulic, pneumatic or electrical type in order to obtain the control of the opening and closing of the gripper from actuating means located above the level of the pool.

The invention is used for the extraction of any type of foreign pieces or particles from a fuel assembly of a nuclear reactor cooled by light water.

I claim:

1. Device for extraction of foreign particles from fuel assemblies of a core of a nuclear reactor which fuel assemblies are placed under water in a pool, said device comprising
   (a) a vertical pole having an upper end and a lower end;
   (b) a manipulating member at said upper end of said pole for displacing said pole in horizontal and vertical directions;
   (c) a gripper support mounted pivotally about a horizontal axis at said lower end of said pole;
   (d) a gripper of a shape and size adapted to an extraction to be performed and being fastened to one end of said gripper support;
   (e) elastic return means cooperating with said pivoting gripper support so as to return said gripper into a grasping position distant from a vertical axis of said pole; and
   (f) a control mechanism for opening and closing said gripper, said gripper support comprising a flexible element passing through a sheath connected directly, at a first end of said sheath, to a movable nose of said gripper and connected, at a second end of said sheath, to means for exerting a pull and a push on said flexible element, making it possible to open and close said gripper.

2. Device according to claim 1, wherein said gripper support is mounted at the end of said pole by means allowing removal and replacement of said gripper support and locking of said gripper support against pivoting about said horizontal axis.

3. Device according to claim 1, wherein said pole is fixed, at its upper end, to a means making it possible to adjust orientation of said pole about said vertical axis.

4. Device according to claim 1, wherein said pole comprises a plurality of successive longitudinal portions, in order to adjust a length of said pole and to operate said gripper at a definite depth below the level of said pool.

5. Device according to claim 1, wherein a return force of said elastic return means is adjustable.

6. Device according to claim 5, wherein said elastic return means consist of springs fastened, at one of their ends, to said gripper support, and, at their other end, to a lower part of said pole, at a point adjustable in the vertical direction of said pole.

* * * * *